United States Patent
Kwakernaak et al.

(10) Patent No.: US 7,546,011 B2
(45) Date of Patent: Jun. 9, 2009

(54) MONOLITHICALLY INTEGRATED OPTICAL DEVICES WITH AMORPHOUS SILICON ARRAYED WAVEGUIDE GRATINGS AND INGAASP GAIN

(75) Inventors: Martin H. Kwakernaak, New Brunswick, NJ (US); Hooman Mohseni, Wilmette, IL (US); Gary Pajer, Yardley, PA (US)

(73) Assignee: Novatronix Corporation, Seoul (KR)

( * ) Notice: Subject to any disclaimer, the term of this patent is extended or adjusted under 35 U.S.C. 154(b) by 0 days.

(21) Appl. No.: 11/545,080

(22) Filed: Oct. 6, 2006

(65) Prior Publication Data

US 2007/0160326 A1  Jul. 12, 2007

Related U.S. Application Data

(60) Provisional application No. 60/724,444, filed on Oct. 7, 2005.

(51) Int. Cl.
   G02B 6/34 (2006.01)
   G02B 6/12 (2006.01)
   G02B 6/28 (2006.01)
   G02B 6/35 (2006.01)

(52) U.S. Cl. ............... 385/37; 385/14; 385/16; 385/24

(58) Field of Classification Search .......... 385/37
   See application file for complete search history.

(56) References Cited

U.S. PATENT DOCUMENTS

| | | | | |
|---|---|---|---|---|
| 5,373,517 A * | 12/1994 | Dragone et al. | ............... | 372/20 |
| 5,881,079 A * | 3/1999 | Doerr et al. | ............... | 372/20 |
| 6,014,390 A * | 1/2000 | Joyner | ............... | 372/20 |
| 6,055,250 A * | 4/2000 | Doerr et al. | ............... | 372/23 |
| 6,192,170 B1 * | 2/2001 | Komatsu | ............... | 385/15 |
| 6,240,118 B1 * | 5/2001 | Doerr et al. | ............... | 372/64 |
| 6,380,006 B2 | 4/2002 | Kido | | |
| 6,434,175 B1 * | 8/2002 | Zah | ............... | 372/20 |
| 6,614,977 B2 * | 9/2003 | Johnson et al. | ............... | 385/129 |
| 2003/0016895 A1 | 1/2003 | Holm et al. | | |
| 2004/0248380 A1 | 12/2004 | Aulnette | | |
| 2004/0265745 A1 | 12/2004 | Sho et al. | | |
| 2005/0002424 A1 * | 1/2005 | Bernasconi et al. | ............... | 372/20 |

* cited by examiner

*Primary Examiner*—Michelle R Connelly Cushwa
(74) *Attorney, Agent, or Firm*—Drinker Biddle Reath LLP

(57) ABSTRACT

An optical waveguide assembly and method of forming the same is described. The optical waveguide assembly includes a waveguide, an amorphous silicon arrayed waveguide grating communicative with the waveguide, and an integrated amorphous silicon waveguide grating laser which communicatively outputs a laser output responsive to the amorphous silicon arrayed waveguide grating. The method includes providing a waveguide, providing an amorphous silicon arrayed waveguide grating communicative with the waveguide, and providing an integrated amorphous silicon waveguide grating laser which communicatively outputs a laser output responsive to the amorphous silicon arrayed waveguide grating.

6 Claims, 6 Drawing Sheets

Schematic of the new AWG design elements.

Superposition of the 8 individually measured laser spectra. for each measurements the output amplifier, the common gain section and one of the 8 channel gain sections are turned on.

Schematic of single mode rib a-SIN$_x$:H waveguide. The rib is 2μm wide.

Schematic of a buried a-Si waveguide.

Schematic of the new AWG design elements.

Layout of passive AWGs.

Measured transmission through the new AWG design in a-Si on Si substrate. Input at the center waveguide, Outputs tghrough the 8 output waveguides (different colors signify different output waveguides).

AWG measurement with input into side-waveguides.

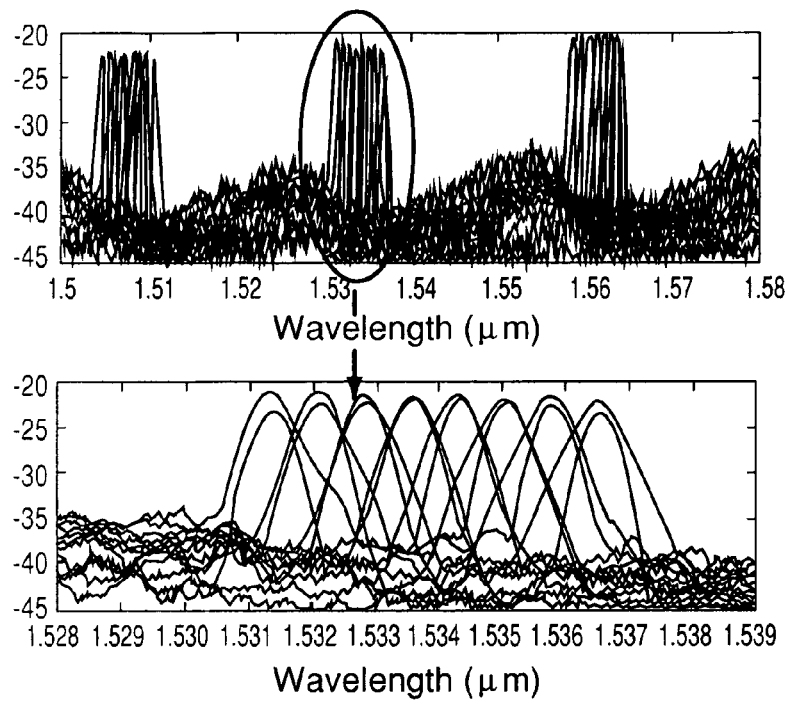

FIG. 7

Measured transmission through the AWGs. Input at the side input waveguides. The output is collected at 8 output waveguides. The measurements of the left side-input (blue) and right side-input (red) are overlaid (16 traces total).

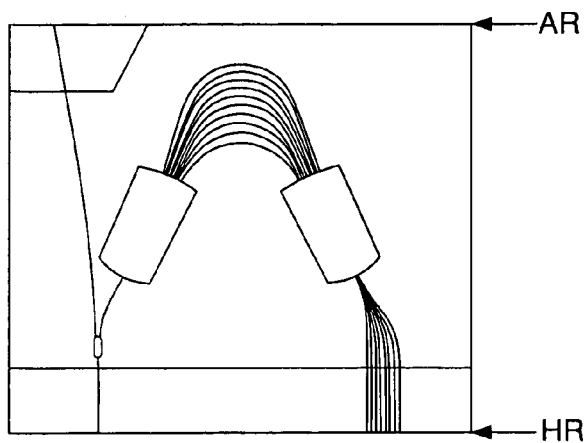

FIG. 8

Schematic of the integrated multi-λ laser. The gain section are in the blue areas, the a-Si waveguides and components are in the green areas.and components are in the green areas.

Mask layout of one multi-λ AWG laser

Mask layout of a laser design which taps the output by using an other grating order.

MONOLITHICALLY INTEGRATED OPTICAL DEVICES WITH AMORPHOUS SILICON ARRAYED WAVEGUIDE GRATINGS AND INGAASP GAIN

CROSS REFERENCE TO RELATED APPLICATIONS

This application claims the benefit of priority to copending U.S. Provisional Patent Application Ser. No. 60/724,444, entitled "MONOLITHICALLY INTEGRATED OPTICAL DEVICES WITH AN AMORPHOUS SILICON ARRAYED WAVEGUIDE GRATINGS AND InGaAsP GAIN SECTIONS", filed Oct. 7, 2005, the entire disclosure of which is hereby incorporated by reference as if being set forth herein in its entirety.

STATEMENT REGARDING FEDERALLY SPONSORED RESEARCH

FIELD OF THE INVENTION

The present invention is directed generally to waveguides, and, more particularly, to an amorphous silicon arrayed waveguide grating (AWG) and integrated AWG-laser.

BACKGROUND OF THE INVENTION

Optical waveguides are the cornerstone of integrated optical circuits. An optical waveguide or combination of optical waveguides is typically assembled to form devices such as couplers, splitters, ring resonators, arrayed waveguide gratings, mode transformers, and the like. These devices are further combined on an optical chip to create an integrated optical device or circuit for performing the desired optical functions, such as, for example, switching, splitting, combining, multiplexing, demultiplexing, filtering, and clock distribution. As used herein, the expression "integrated optical circuits" may include a combination of optically transparent elongated structures for guiding, manipulating, or transforming optical signals that are formed on a common substrate or chip of monolithic or hybrid construction.

Typically, formation of the waveguide begins with formation of the lower optical cladding on a suitable substrate, followed by formation of an optical core, typically by chemical vapor deposition, lithographic patterning, and etching, and finally, surrounding the core with an upper optical cladding layer. For example, a ridge waveguide is typically formed on a substrate by forming a lower optical cladding, then forming through chemical vapor deposition, lithographic patterning, and etching, an optical core element, and lastly by surrounding the optical core element with an upper optical cladding layer. Other types of optical waveguides used in the formation of integrated optical devices and circuits include slab, ridge loaded, trench defined, and filled trench waveguides.

Further, semiconductor devices often include multiple layers of conductive, insulating, and semiconductive layers. Often, the desirable properties of such layers improve with the crystallinity of the layer. Attempts have been made to fabricate high quality crystalline optical waveguide devices. However, such attempts typically have succeeded only on bulk oxide substrates. Attempts to grow such devices on a single crystal semiconductor or compound semiconductors substrates, such as germanium, silicon, and various insulators, have generally been unsuccessful because crystal lattice mismatches between the host crystal of the substrate and the grown crystal of the optical waveguide layer have caused the resulting crystal of the optical waveguide layer to be of low crystalline quality.

Silicon (Si) is the most widely used semiconductor material in modern electronic devices. Single crystalline Si of high quality is readily available, and the processing and microfabrication of Si are well known. The transparency of Si in the near-infrared makes Si an ideal optical material.

In part due to these ideal optical properties, Si-based waveguides are often employed as optical interconnects on Si integrated circuits, or to distribute optical clock signals on an Si-based microprocessor. In these and other instances, Si provides improved integration with existing electronics and circuits. However, at present pure Si optical waveguide technology is not well developed, in part because fabrication of waveguides in Si requires a core with a higher refractive index than that of crystalline Si (c-Si).

Historically, optical links were single wavelength and point-to-point, with all functionality in the electronics domain. The implementation of telecommunication functions in the optical domain, in conjunction with the aforementioned development of the understanding of silicon as an optical material, led to the development of the optical integrated circuit (OEIC). The OEIC fabrication process borrows heavily from the electronic integrated circuit field, and as such may employ planar deposition, photolithography, and dry etching to form optical waveguides analogous to electronic circuit conductors.

An OEIC developed in the late 1990's is the arrayed waveguide grating (AWG). The AWG added multi-wavelength functionality for a wavelength division multiplexed (WDM) fiber optic network. Attempts to integrate voltage-controlled switching and attenuation functions into a silica glass platform exposed drawbacks stemming from the incorporation of classical IC technology for OEIC, including difficulty in processing optical materials with standard microelectronics fabrication equipment, a lack of repeatability, and high power consumption that caused chip-heating problems. Fortunately, silicon optical waveguiding technology, including and in conjunction with AWG technology, provides for the production of low-cost, reliable, repeatable, low power silicon OEICs.

A need exists to utilize amorphous silicon in conjunction with AWG technology to further meet the needs of OEICs in developing optical devices.

BRIEF SUMMARY OF THE INVENTION

An optical waveguide assembly and method of forming the same is described. The optical waveguide assembly includes a waveguide, an amorphous silicon arrayed waveguide grating communicative with the waveguide, and an integrated amorphous silicon waveguide grating laser which communicatively outputs a laser output responsive to the amorphous silicon arrayed waveguide grating. The method includes providing a waveguide, providing an amorphous silicon arrayed waveguide grating communicative with the waveguide, and providing an integrated amorphous silicon waveguide grating laser which communicatively outputs a laser output responsive to the amorphous silicon arrayed waveguide grating.

Thus, the present invention utilizes amorphous silicon in conjunction with AWG technology for developing high quality optical devices.

BRIEF DESCRIPTION OF THE SEVERAL VIEWS OF THE DRAWINGS

For the present invention to be clearly understood and readily practiced, the present invention will be described in conjunction with the following figures, wherein like reference numerals represent like elements, and wherein:

FIG. 7 is a set of graphs of measured transmission through the AWGs, according to an aspect of the present invention;

FIG. 8 is a schematic of an integrated multi-λ laser, according to an aspect of the present invention;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in optical waveguiding devices. Those of ordinary skill in the art will recognize that other elements are desirable and/or required in order to implement the present invention. However, because such elements are well known in the art, and because they do not facilitate a better understanding of the present invention, a discussion of such elements is not provided herein.

Amorphous silicon (a-Si) presents advantageous properties as an Si-based waveguide core material. A-Si is a non-crystalline allotropic form of silicon. Silicon is normally tetrahedrally bonded to four neighboring silicon atoms, which is the case in amorphous silicon. However, unlike c-Si, a-Si does not form a continuous crystalline lattice. As such, some atoms in an a-Si structure may have "dangling bonds," which occur when one of the tetrahedral bonds of the a-Si does not bond to one of the four neighboring atoms. Thus, a-Si is "under-coordinated." The under-coordination of a-Si may be passivated by introducing hydrogen into the silicon. The introduction of hydrogen for passivation forms hydrogenated a-Si. Hydrogenated a-Si provides high electrical quality and relatively low optical absorption.

The density of pure silicon is lower than that of c-Si, and the refractive index of pure a-Si at near-infrared wavelengths is higher than that of c-Si. A-Si is thus serviceable as a waveguide core material on c-Si. However, as discussed above pure a-Si may contain a large density of point defects and dangling bonds, and as such the optical absorption by an a-Si core at near-infrared wavelengths may be significant without the aforementioned passivation.

Hydrogenated a-Si films may be deposited using a number of different techniques, including plasma enhanced chemical vapor deposition (PECVD), RF sputtering, and hot-filament CVD. Hydrogen content, void density, structural properties and optical and electronic properties of hydrogenated a-Si films are critically dependent on the precise nature of the processing conditions by which the a-Si film is created. Hydrogenated a-Si provides better transparency in the near-infrared than pure a-Si, but pure a-Si can be processed more easily. Pure a-Si has larger thermal stability then hydrogenated a-Si.

Further, such a-Si films may be formed using PECVD to have properties different from those of pure a-Si. For example, an N2-based PECVD formation of a-Si may form an amorphous silicon nitride (a-SiNy). Silicon nitrides generally are used for a myriad of purposes in a variety of compound semi-conductor devices. Such uses include surface passivation, interlayer elements and capacitor dielectrics.

Figure 1A:
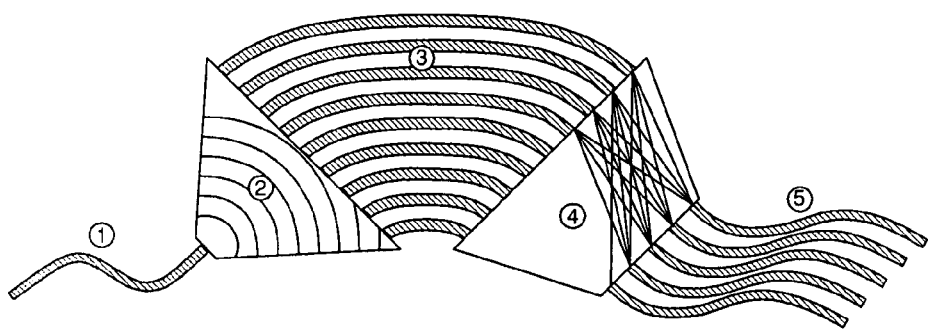
FIG. 1A is an arrayed waveguide grating.

Arrayed waveguide gratings (AWG) are widely used in material systems, such as silica systems, for multiplexing and demultiplexing of optical signals, such as of VV-DM signals. An AWG may combine or split, such as through a star coupler, optical signals of different wavelengths. As illustrated in FIG. 1A, an AWG preferably is comprised of a number of arrayed channel waveguides that, together, act as a spectrometric diffraction grating. Typically, light incoming, such as via a light fiber, enters the AWG at a multimode waveguide, and propagates through multiple single mode waveguides to a second multimode section, and finally light exits via a plurality of output fibers. The input and output points of the AWG may include couplers, such as the star coupler, to multiplex or de-multiplex multiple input wavelengths to a single output, or a single input into multiple wavelength, multiple outputs.

AWG's may be formed of hydrogenated amorphous silicon (a-Si). The present invention includes an integrated photonic device that may include an a-Si AWG, and that may include, for example, an Indium Gallium Arsenide Phosphide (InGaAsP) gain section. This integrated device may be a multi-wavelength laser with wavelengths determined by the AWG channels. Similar devices may use Indium Gallium Arsenide Phosphide/Indium Phosphide (InGaAsP/InP) materials for both gain sections and the AWG.

Figure 1B:
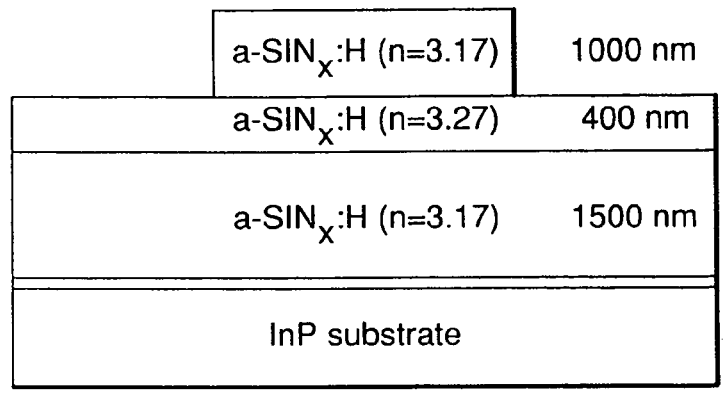
FIG. 1B is a schematic of a single mode rib a-SiN$_x$:H waveguide according to an aspect of the present invention.

Referring now to FIG. 1B, there is shown a schematic of a single mode, such as a single mode rib, a-SiN$_x$:H waveguide according to an aspect of the present invention. As may be seen in FIG. 1B, the rib may be approximately 2 µm wide, or it may be other widths, including, but not limited to, 1 µm to 2 µm wide, 2 µm to 3 µm wide, or 1 µm to 4 µm wide. The AWG may be based on single mode waveguides, rib-type waveguides, buried waveguides, or other waveguides that may be understood by those possessing an ordinary skill in the pertinent art. The a-Si layers illustrated in FIG. 1B may be deposited with PECVD and the rib may be dry etched using RIE (Reactive Ion Etching), for example.

Figure 2:
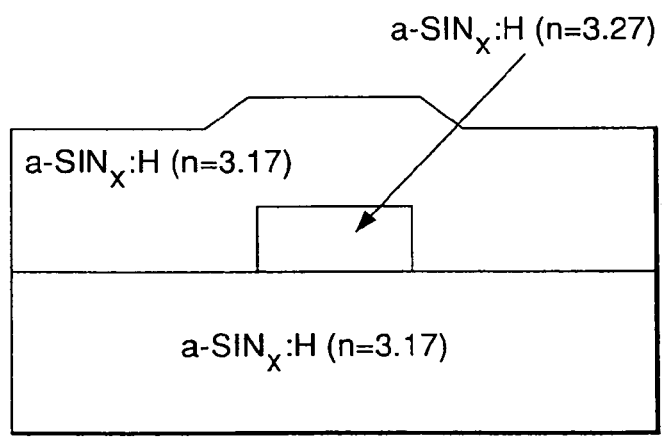
FIG. 2 is a schematic of a buried a-Si waveguide according to an aspect of the present invention.

Referring now to FIG. 2, there is shown a schematic of a buried a-Si waveguide according to an aspect of the present invention. As mentioned hereinabove with respect to FIG. 1B, the AWG of the present invention may be based on buried waveguides, or the AWG may be based on other waveguide types that may be understood by those possessing an ordinary skill in the pertinent art.

After the selected waveguide is etched, such as by RIE as discussed with respect to FIG. 1B, a second a-Si layer may be deposited over the waveguide. Thereby, four different designs of an AWG laser portion of the device may result, and those designs are summarized in Table 1.

TABLE 1

|  | Bend radius ~600 μm | Bend radius ~1000 μm |
| --- | --- | --- |
| Splitter in input waveguide | X | X |
| 2nd order tapping of output | X | X |

Two bending radii (approximately 600 μm and approximately 1000 μm) and two different schemes for tapping the output light (splitter in input waveguide and second-order tapping of output) are discussed in exemplary embodiments of the present invention. However, these embodiments are merely exemplary, as any bending radius may be used, including, but not limited to, approximately 100 to approximately 600 μm, approximately 600 to approximately 1000 μm, and approximately 1000 μm to approximately 2000 μm. Also, other schemes may be used for tapping the output light as may be understood to those possessing an ordinary skill in the pertinent art.

Bending radii may determine device size and length, but may also be responsible for leakage losses. Together with losses due to material absorption and scattering loss due to etching roughness, an optimal bending radius that may ultimately result in lower overall losses may vary, depending on the results of etching.

Figure 3:
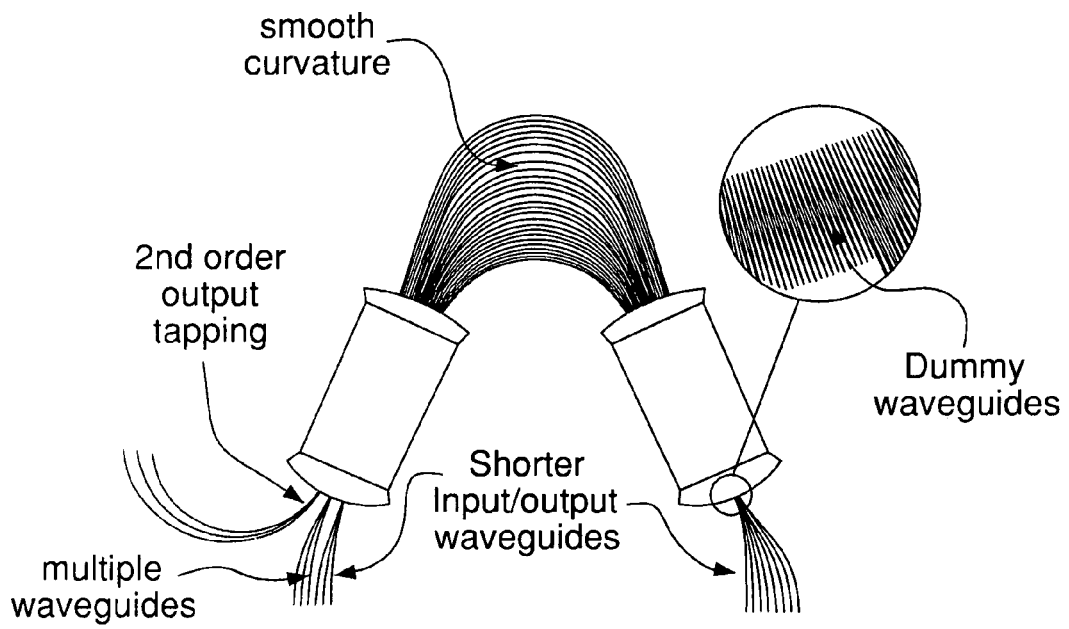
FIG. 3 is a schematic of the new AWG design elements according to an aspect of the present invention.

Referring now to FIG. 3, there is shown a schematic of an AWG according to an aspect of the present invention. As may be seen in FIG. 3, in addition to use of a splitter in one of the input waveguides to the AWG, other schemes for tapping the light may be used. The present invention takes advantage of the fact that the light at the output facet of the AWG may focus into several points. One point may be used to form the laser cavity and another may be used to direct the light to an output amplifier. Further, in order to avoid reflections, dummy waveguides may be introduced to the star-coupler output. Finally, to prevent modal conversion, a gradual change of curvature along the arrayed waveguides may be used.

Figure 4:
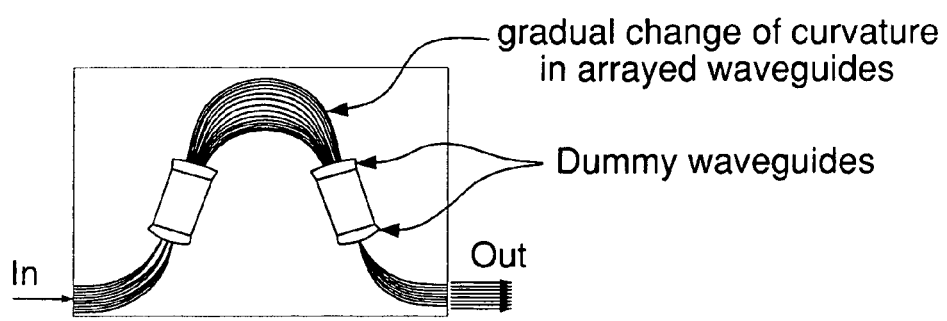
FIG. 4 is a schematic of a layout of passive AWGs according to an aspect of the present invention.

Referring now to FIG. 4, there is shown a schematic of a layout of a passive AWG according to an aspect of the present invention. As may be seen in FIG. 4, the arrayed waveguides may be formed from a combination of straight segments and arcs. At the junction between the straights and arcs, the waveguide curvature may change abruptly. This curvature change may result in a modal mismatch at the junction, which may excite a higher order mode. Even if these modes are un-guided, the distortion may still propagate over the short distance into the star coupler. This may result in a distortion of the modes as they exit the arrayed waveguides and enter the star-coupler. A distortion of the waveguide mode may directly translate into a distortion of light envelope (channel non-uniformity), since the input and output of the star-coupler may be related by Fourier transformation.

Figure 5:
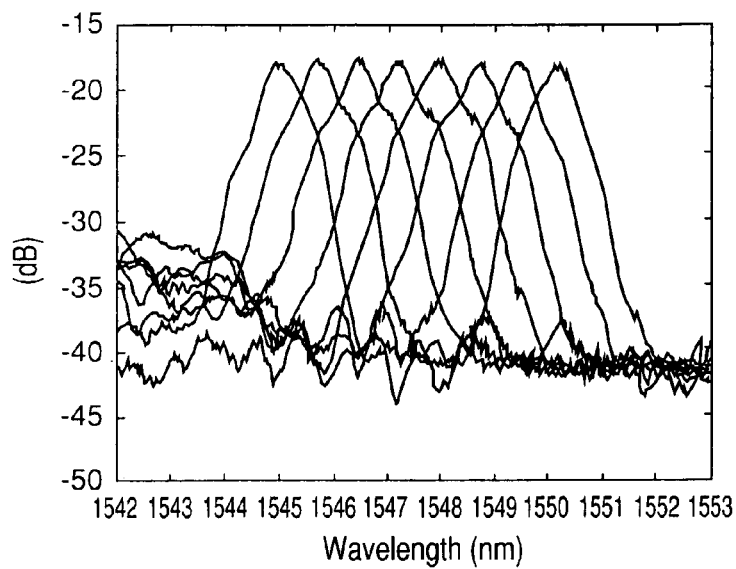
FIG. 5 is a graph of the measured transmission through the AWG design in a-Si on a Si substrate, according to an aspect of the present invention.

Referring now to FIG. 5, there is shown a graph of the measured transmission through the AWG design in a-Si on a Si substrate, with input at the center waveguide, and with outputs through eight output waveguides. As may be seen in FIG. 5, light may injected into the center input waveguide and measured separately for each of the illustrated 8 output channels (compare with FIG. 4). As such, output channels may be very uniform and symmetric around the center channel. The measured insertion loss may be approximately 18 dB. This may include reflection loss at the facets due to reflection (3 dB), fiber-coupling loss of approximately 3-4 dB, and the device loss. The remaining approximately 12 dB may be in good agreement with the AWG design loss (approximately 4 dB) and the waveguide loss (approximately 8 dB loss over the device length assuming 2 cm–1 waveguide loss).

Figure 6:
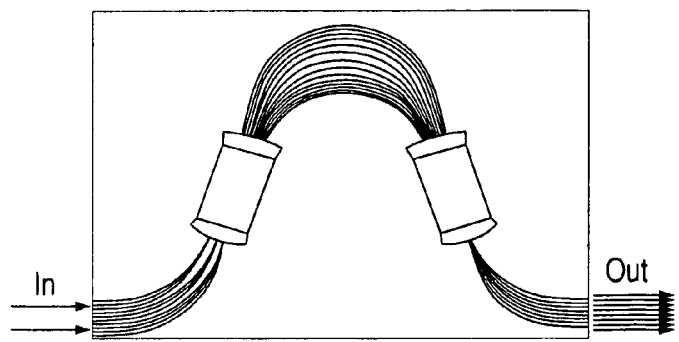
FIG. 6 is a schematic of AWG measurement with input into side-waveguides according to an aspect of the present invention.

Referring now to FIG. 6, there is shown a schematic of AWG measurement with input into side-waveguides according to an aspect of the present invention. As may be seen in FIG. 6, measurements may be obtained by injecting light into the side-waveguides. The side-waveguides may be placed such that the throughput through the AWG overlaps for the left-side input and the right side input.

Referring now to FIG. 7, there are shown graphs of measured transmission through the AWGs, with input at the side input waveguides, output collected at the 8 output waveguides, and the measurements of the left side-input and right side-input overlaid (16 traces total), according to an aspect of the present invention. As may be seen in FIG. 7, the output through the left side input may overlap with the next higher order output through the right side-input. In this mode, the AWG may be used in the AWG-Laser cavity as a spectral filter as well as an output splitter.

According to an aspect of the present invention, the mask for AWG lasers may contain two designs: one with an AWG used with the center input and a splitter to tap the light out of the laser cavity, and the second design using an AWG with waveguides entering on the side of the star-coupler; the latter design may not need an extra coupler. As may be seen in FIG. 7, overlapping transmission in AWGs are demonstrated with input waveguides placed left and right to the side of the star-coupler. These devices may be used in the AWG lasers to filter and couple-out the light.

Referring now to FIG. 8, there is shown a schematic of an integrated multi-λ laser, with gain sections, and a-Si waveguides and components, according to an aspect of the present invention. As may be seen in FIG. 8, an integrated multi-λ laser may consist of components, including, but not limited to: InP/InGaAsP quantum well gain elements; amorphous silicon waveguides and arrayed waveguide grating; and an interface between a-Si waveguides and active III-V waveguides. The laser cavity may be formed of the AWG, which may act as an intra-cavity filter, gain elements to compensate for optical losses, and mirrors formed from cleaved facets. The laser cavity may be located between the BR coated facets of one of the 8 gain sections on the right and the common gain section. The AWG may act as an intra-cavity filter, and it may determine the lasing wavelength. By selecting one of the 8 gain sections on the right, the laser wavelength may be selected, according to the corresponding AWG channel. Part of the light may split out of the cavity and be amplified through an output amplifier.

Figure 9:
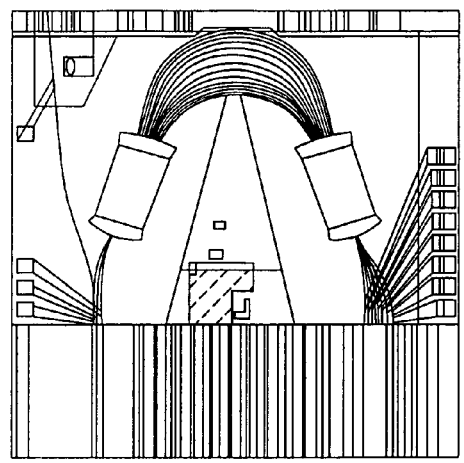
FIG. 9 is a mask-layout of a multi-X AWG laser according to an aspect of the present invention.

Referring now to FIG. 9, there is shown a mask-layout of a multi-X AWG laser according to an aspect of the present invention. A mask layout contains the geometric details and the relative positioning of each layer of a circuit to be used in fabrication.

Figure 10:
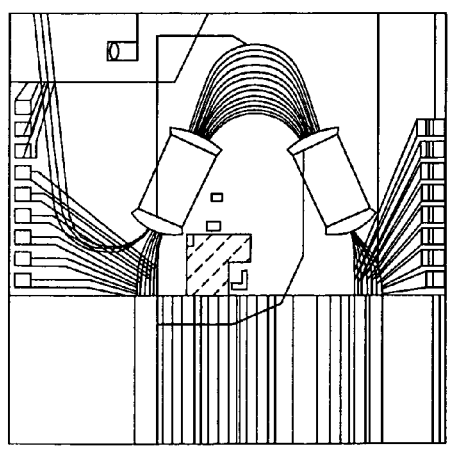
FIG. 10 is a mask layout of a laser design which taps the output by using another grating order, according to an aspect of the present invention.

Referring now to FIG. 10, there is shown a mask layout of a laser design which taps the output by using another grating order, according to an aspect of the present invention. As may be seen in FIG. 10, this design may use a tile next order grating mode for output coupling.

Figure 11:
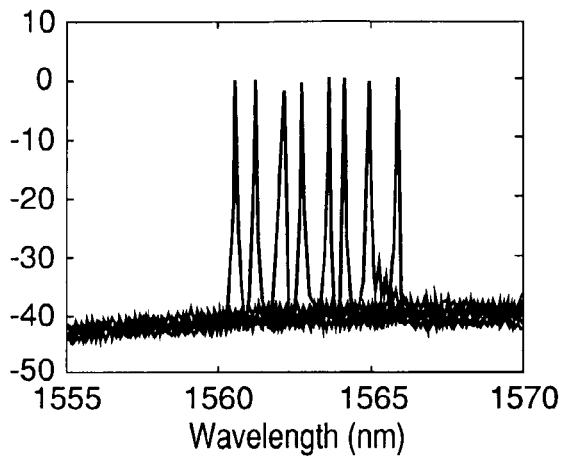
FIG. 11 is a graph of the measured output spectrum of a multi-wavelength laser, according to an aspect of the present invention.

Referring now to FIG. 11, there is shown the measured output spectrum of a multi-wavelength laser, according to an aspect of the present invention. As may be seen in FIG. 11, the 8 individually measured laser spectra may be superimposed. For each measurement, the output amplifier, the common gain section, and one of the 8 channel gain sections may be turned on.

Those of ordinary skill in the art will recognize that many modifications and variations of the present invention may be implemented. The foregoing description and the following claims are intended to cover all such modifications and variations falling within the scope of the following claims, and the equivalents thereof.

What is claimed is:

1. An optical waveguide assembly comprising:
   a plurality of waveguides;
   an amorphous silicon arrayed waveguide grating communicative with said waveguides; and,
   an integrated III-V semiconductor device which communicatively outputs a laser output in cooperation with said amorphous silicon arrayed waveguide grating;
   wherein, the amorphous silicon waveguide grating and III-V semiconductor device are coupled such that the amorphous silicon waveguide grating at least spectrally filters and beam splits a laser output from a lasing cavity, and
   wherein said amorphous silicon arrayed waveguide grating further comprises a second order tapping of output.

2. A method of forming an optical waveguide assembly, said method comprising:
   providing a plurality of waveguides;
   an amorphous silicon arrayed waveguide grating communicative with said waveguides;
   providing an integrated III-V semiconductor device which communicatively outputs a laser output in cooperation with said amorphous silicon arrayed waveguide grating; and
   spectrally filtering and beam splitting a laser output from a lasing cavity using the amorphous silicon waveguide grating,
   wherein said providing said amorphous silicon arrayed waveguide grating further comprises providing a second order tapping of output.

3. An optical waveguide assembly comprising:
   an amorphous silicon arrayed waveguide grating;
   first and second couplers, each coupler being integrated with and optically coupled to the arrayed waveguide grating;
   a plurality of amorphous silicon waveguides, each amorphous silicon waveguide being integrated with and optically coupled through one of the couplers to the arrayed waveguide grating;
   a plurality of semiconductor gain elements, each gain element being integrated with and optically coupled through a corresponding one of the amorphous silicon waveguides and either the first or second coupler to the arrayed waveguide grating; and
   an output amplifier integrated with and optically coupled through a corresponding other of the amorphous silicon waveguides and the second coupler to the arrayed waveguide grating;
   wherein, at least some others of the amorphous silicon waveguides are optically coupled through either the first or second coupler to the arrayed wavguide grating but not the gain elements or the output amplifier so as to mitigate reflections.

4. The assembly of claim 3, further comprising a plurality of reflective facets, wherein each facet is integrated with and optically coupled to one of the semiconductor gain sections.

5. The assembly of claim 4, further comprising a splitter integrated with and optically coupled between one of the facets and the output amplifier.

6. The assembly of claim 4, wherein:
   the arrayed waveguide grating comprises an output facet and is configured to focus light at the output facet into a plurality of spots;
   at least one of the spots is position to direct light to at least one of the gain sections so as to form a lasing cavity; and
   at least one other of the spots corresponds to the output amplifier so as to provide an output.

* * * * *